United States Patent
Sato

[11] Patent Number: 5,184,946
[45] Date of Patent: Feb. 9, 1993

[54] WINDSHIELD WASHER PUMP ASSEMBLY

[75] Inventor: Toshihiro Sato, Toyohashi, Japan

[73] Assignee: Asmo Co., Ltd., Shizuoka, Japan

[21] Appl. No.: 788,930

[22] Filed: Nov. 7, 1991

[30] Foreign Application Priority Data

Nov. 8, 1990 [JP] Japan .................. 2-117870[U]

[51] Int. Cl.⁵ .............................................. F04B 35/04
[52] U.S. Cl. .................................. 417/423.9; 417/360
[58] Field of Search ................. 417/360, 423.1, 423.3, 417/423.9

[56] References Cited

U.S. PATENT DOCUMENTS

| | | | |
|---|---|---|---|
| 4,461,614 | 7/1984 | Niedermeyer | 417/423.9 |
| 4,591,319 | 5/1986 | Takahashi et al. | 417/360 |
| 4,966,534 | 10/1990 | Hasslen, III | 417/423.3 |
| 5,074,764 | 12/1991 | Kobayashi et al. | 417/423.3 |

FOREIGN PATENT DOCUMENTS

| | | |
|---|---|---|
| 0284662 | 5/1988 | European Pat. Off. . |
| 2139940 | 2/1973 | Fed. Rep. of Germany . |
| 7811452 | 8/1978 | Fed. Rep. of Germany . |
| 2343139 | 9/1977 | France . |
| 2-60659 | 5/1990 | Japan . |
| 1161868 | 8/1969 | United Kingdom . |

Primary Examiner—Richard A. Bertsch
Assistant Examiner—Charles G. Freay
Attorney, Agent, or Firm—Burns, Doane, Swecker & Mathis

[57] ABSTRACT

A windshield washer pump assembly for jetting a rinsing fluid from a fluid tank onto a windshield to assist windshield wiping operation performed by an automotive windshield wiper. The assembly comprises a washer pump comprising a rotatably supported impeller and a generally cylindrical casing having a fluid inlet, defined in an annular end wall thereof, and a fluid outlet defined in opposition to the fluid inlet. The washer pump is secured to a wall of the fluid tank with the fluid inlet positioned inside the fluid tank. The casing is also formed with a partition wall positioned on one side of the annular end wall to define a pump chamber between the annular end wall and the partition wall for operatively accommodating the impeller. The washer pump assembly also comprises a fluid passage communicating the pump chamber and the fluid outlet for a discharge of the fluid medium under pressure during a rotation of the impeller, a filter member having a perforated region of a diameter greater than the bore size of the fluid inlet positioned exteriorly of the fluid inlet with the perforated region aligned with the fluid inlet, and a filter holder for detachably securing the filter member to the second end of the casing.

6 Claims, 3 Drawing Sheets

WINDSHIELD WASHER PUMP ASSEMBLY

BACKGROUND OF THE INVENTION

1. Field of the Invention

The present invention relates to an automotive windshield washer pump designed to jet a rinsing fluid onto an automotive windshield to assist a windshield wiping operation.

2. Description of the Prior Art

The automotive windshield washer system now in use in automotive vehicles generally comprises at least one windshield wiper adapted to be driven by a drive unit to move back and forth across the windshield, a windshield washer pump having an inlet and an outlet, at least one jetting nozzle generally disposed on a bonnet and fluid-connected with the outlet of the washer pump for jetting a rinsing fluid onto the windshield, and a container or tank for accommodating a quantity of the rinsing fluid and fluid-connected with the inlet of the washer pump.

It is well understood that, when foreign matter such as, for example, sand particles, enter the container in admixture with the rinsing fluid being filled in the container, it may be sucked into the washer pump during an operation of the washer pump, thereby damaging an impeller used in the washer pump. Once the impeller is damaged, problems would occur in that the washer pump may operate erroneously and that the jetting nozzle may be clogged. In either case, the rinsing fluid will no longer be jetted satisfactorily onto the windshield.

The Japanese Laid-open Utility Model Publication No. 2-60659, published May 7, 1990, discloses a solution to the foregoing problems. This will now be discussed with reference to FIG. 7.

According to that publication, the windshield washer system comprises a tank having a pump mounting hole 1a defined in a portion of the side wall 1 thereof adjacent the bottom of the tank. A generally tubular grommet 2 having outer and inner open ends 2a and 2b is inserted into the pump mounting hole 1a with the inner open end 2b protruding into the tank. An inlet nipple 3 that communicates with the inlet of the washer pump is fluid-tightly inserted into the grommet 2 through the outer open end 2a thereof. The inlet nipple 3 may be either an integral part of a pump casing forming the washer pump or a member separate therefrom.

The grommet 2 has an inner peripheral surface formed with an annular groove 2c extending circumferentially thereof and positioned adjacent the inner open end 2b thereof, and a filter member 4 is installed inside the grommet 2 with its outermost peripheral edge portion 4a received in the annular groove 2c.

According to the above mentioned publication, use is made of the filter member 4 to avoid any possible entry of the foreign matter from the tank into the washer pump. It has, however, been found that the solution suggested by the above mentioned publication poses the following problems.

(1) Although no foreign particles contained within the tank will substantially pass through the filter member 4, they tend to pile up around an outer peripheral portion of the filter member 4 adjacent the inner peripheral surface of the grommet 2. Once this occurs, the effective cross-sectional area of the filter member 4 which is utilized for the passage of the rinsing fluid therethrough is essentially reduced, hampering a smooth flow of the rinsing fluid from the tank towards the washer pump. In some cases, the effective cross-sectional area of the filter member 4 may be reduced so considerably as to result in an insufficient jetting of the rinsing fluid.

(2) Since the solution suggested by the above mentioned publication is such that, while the bore size of the inlet nipple 3 is defined according to the pumping capacity of the washere pump, the filter member 4 is installed inside the grommet 2 which receives the inlet nipple 3, the inner diameter of the inlet nipple 3 and the diameter of an inner portion 4b of the filter member 4 positioned radially inwardly of the outermost peripheral edge portion 4a are substantially equal to each other. In other words, the effective cross-sectional area of the filter member 4, which is represented by the total surface area of meshes or interstices of the inner portion 4b of the filter member 4 through which the rinsing fluid can flow, becomes smaller than the cross-sectional area of the bore of the inlet nipple 3. Accordingly, the provision of the filter member 4 in the manner described above causes a problem in that a rated flow of the rinsing fluid defined by the bore size of the inlet nipple 3 will not flow towards the washer pump, accompanied by a substantial reduction in pumping capacity of the washer pump. This is turn brings about a reduction in the amount of the rinsing fluid to be jetted onto the windshield.

(3) As a matter of course, a replenishment of a quantity of rinsing fluid is required when the tank is emptied. At the time of replenishment, air is trapped within a space S inside the grommet 2 and delimited between the filter member 4 and the inlet nipple 3. When the rinsing fluid is supplied into the tank through a supply port while the air is trapped within the space S, no rinsing fluid being supplied into the tank will flow towards a pump chamber through the interstices or meshes in the inner portion 4b of the filter member 4 due to a surface tension acting in those interstices or meshes between the rinsing fluid and the air. Therefore, even though the tank has been filled with the rinsing fluid, the air trapped between the filter member 4 and the inlet nipple 3 may hamper a smooth supply of the rinsing fluid towards the pump chamber even though the washer pump is subsequently operated. Specifically, where the washer pump is of a centrifugal type wherein the fluid medium is supplied by the action of a centrifugal force, the presence of the trapped air hampers a smooth supply of the rinsing fluid under pressure towards the nozzle. Under these circumstances, the washer pump tends to run idle without the air being discharged, failing to accomplish a proper jetting of the rinsing fluid.

SUMMARY OF THE INVENTION

The present invention has been devised with a view to substantially eliminating the above discussed problems inherent in the prior art windshield washer system and is intended to provide a substantial elimination of any possible accumulation of a foreign matter at an inlet side of the filter member while enabling a supply of a rated quantity of the rinsing fluid, which is defined in consideration of the bore size of the inlet nipple, towards the pump chamber.

Another important object of the present invention is to provide a substantial elimination of the possibilty of the air being trapped inside the inlet nipple and between the filter member and the inlet nipple thereby to eliminate the possible idle run of the washer pump.

In order to accomplish the foregoing objects, there is disclosed, in accordance with the present invention, a washer pump assembly which comprises a fluid tank for accommodating a quantity of a fluid medium to be jetted and having a side wall and a bottom wall, and a washer pump means comprising a rotatably supported impeller and a generally cylindrical casing having first and second ends opposite to each other and also having a fluid outlet defined at the first end thereof. The washer pump means is secured to the side wall of the fluid tank with the second end of the casing protruding into the fluid tank. The casing is formed with an annular end wall extending radially inwardly from an inner peripheral surface thereof and also has a fluid inlet of a predetermined bore size defined therein. The casing is also formed with a partition wall extending radially inwardly from the inner peripheral surface thereof and positioned on one side of the annular end wall close to the first end thereof thereby to define a pump chamber between the annular end wall and the partition wall for operatively accommodating the impeller.

The washer pump assembly also comprises a passage means communicating the pump chamber and the fluid outlet for a discharge of the fluid medium under pressure during a rotation of the impeller, a filter medium having a perforated region of a diameter greater than the bore size of the fluid inlet in the annular end wall positioned exteriorly of the second end of the casing with the perforated region aligned with the fluid inlet, and a holder means for detachably securing the filter member to the second end of the casing.

Preferably, the holder means comprises a generally cylindrical filter holder protruding a distance axially outwardly from the second end of the casing in coaxial relation therewith, and a generally ring-shaped filter mount carrying the filter member and having a plurality of detent pawls. The filter holder has defined therein detent holes equal in number to the number of the detent pawls and spaced from each other in a direction circumferentially thereof so that the detent pawls can be engaged in the associated detent holes by a snap action when the filter mount carrying the filter member is fitted to the filter holder.

Preferably, the filter holder may have at least one air vent defined therein for a discharge of air trapped in the pump chamber thereby to avoid any possible idle run of the impeller. This air vent may be constituted by a portion of at least one of the detent cutouts.

Also preferably, the filter holder may have a discharge opening defined therein at a level closest to the bottom wall of the fluid tank and wherein a portion of the filter mount which confronts the discharge opening when the filter mount is fitted to the filter holder is downwardly sloped to substantially continue to the discharge opening for facilitating a discharge of foreign matter which may be contained in the fluid medium being sucked into the pump chamber.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

The windshield washer system is known to be designed for jetting the rinsing fluid onto the windshield to assist the windshield wiping operation performed by the windshield wiper because reference to the term "windshield" is made in the nomenclature. Regardless of the nomenclature, it is well known that similar washer systems are currently used to jet a rinsing fluid onto the headlight cover lenses and onto the rear windowpane. Accordingly, the present invention while being hereinafter described in detail in connection with the windshield washer system is to be understood as applicable to the other washer systems for jetting the rinsing fluid onto the headlight cover lenses and also onto the rear windowpane.

Figure 1:
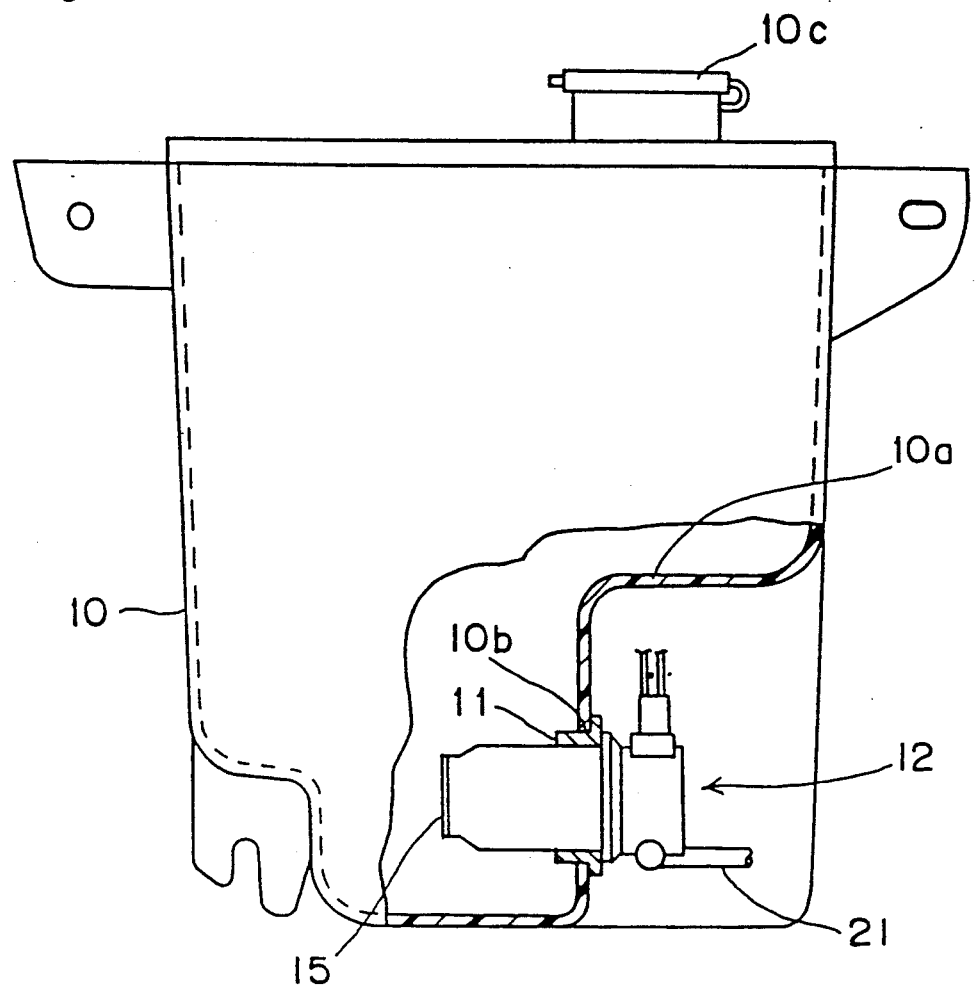
FIG. 1 is a front elevational view, with a portion cut away, of a rinsing fluid tank equipped with a washer pump embodying the present invention.

Referring first to FIG. 1, the windshield washer system comprises a rinsing fluid tank 10 of a generally box-like configuration including four side walls, only one of which is designated by 10a, a bottom wall and a top wall. The top wall of the rinsing fluid tank 10 has a capped supply port 10c defined therein, and one of the side walls 10a has a pump mounting hole 10b defined therein adjacent the bottom wall. A grommet 11 having an annular fitting flange is mounted in the pump mounting hole 10b with the annular flange fluid-tightly welded to the side wall 10b.

A washer pump assembly generally identified by 12 is of a generally cylindrical configuration and is pressure-fitted into the tubular grommet 11. This washer pump assembly 12 is used to supply the rinsing fluid within the tank 10 towards at least one jetting nozzle (not shown) through a tubing 21 to jet or spray the rinsing fluid onto a windshield (not shown) thereby to assist a wiping operation performed by a well-known windshield wiper. As is well known to those skilled in the art, the jetting nozzle is generally disposed on a bonnet or hood above an engine room in an automotive body structure so as to confront the windshield.

Figure 2:
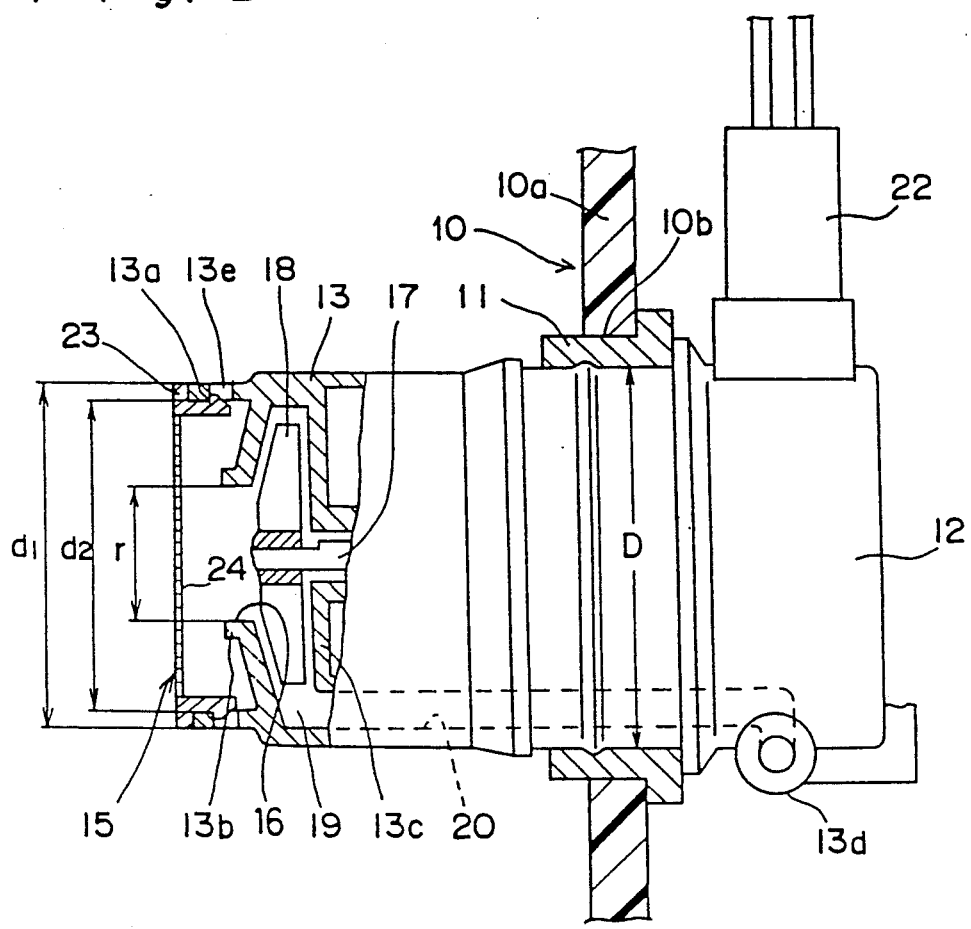
FIG. 2 is a side sectional view, on an enlarged scale, of the washer pump shown in FIG. 1.

The washer pump assembly 12 comprises, as best known in FIG. 2, a generally cylindrical casing 13 having an inner end protruding into the tank 10 and having a fluid inlet opening defined therein. The inner end of the cylindrical casing 13 has a filter holder 13a formed integrally and coaxially therewith for holding a filter member 15 in a manner as will be described later. The inner end of the cylindrical casing 13 opening into the interior of the tank 10 has a radially inwardly extending annular end wall 13b with an inlet port 16 defined therein generally in alignment with the longitudinal axis of the cylindrical casing 13. The cylindrical casing 13 also has a partition wall 13c extending radially inwardly from the inner peripheral surface thereof and positioned on one side of the annular end wall 13b opposite to the filter holder 13a, leaving a pump chamber 19 between the annular end wall 13b and the partition wall 13c.

Within the pump chamber 19 defined inside the cylindrical casing 13 and between the walls 13b and 13c, there is disposed an impeller 18 mounted on a shaft 17 for rotation together therewith. The shaft 17 extends rotatably through the partition wall 13c and is in turn coupled drivingly with a drive unit (not shown) which includes an electric motor and which is housed within a portion of the cylindrical casing 13 on one side of the partition wall 13c opposite to the pump chamber 19.

The cylindrical casing 13 has an axial passage 20 defined therein which is located radially outwardly of the drive unit and which extends from the pump chamber 19 to an outlet nipple 13d mounted rigidly on an outer end of the cylindrical casing 13 so as to protrude outwardly therefrom. Preferably, the axial passage 20 is so defined and so positioned as to extend at the bottom of the cylindrical casing 13 and at a level as close to the bottom of the tank 10 as possible to accomplish a maximized use of the rinsing fluid within the tank 10. The outlet nipple 13d is in turn fluid-connected with the tubing 21 shown in FIG. 1.

Mounted exteriorly on the outer end of the cylindrical casing 13 is an electric connector 22 through which electric power can be supplied from an external power source (not shown) to the drive unit inside the cylindrical casing 13.

Figure 3:
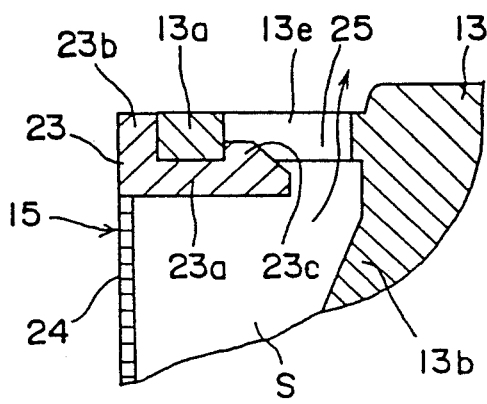
FIGS. 3 and 4 are fragmentary sectional views of different portions of a generally cylindrical casing forming a part of the washer pump, respectively, showing how a filter member is fitted to a holder.

The details of the filter holder 13a for holding the filter member 15 will now be described with particular reference to FIGS. 2 to 4. As best shown in FIG. 2, the filter holder 13a protruding coaxially outwardly from the inner end of the cylindrical casing 13 is in the form of a thin-walled barrel having an outer diameter d1 slightly smaller than the outer diameter D of the cylindrical casing 13 and also having an inner diameter d2 greater than the inner diameter r of the inlet port 16 defined in the end wall 13b. The filter holder 13a has a plurality of generally elongated detent cutouts 13e defined therein so as to extend substantially parallel to the longitudinal sense of the cylindrical casing 13 and spaced a distance, preferably an equal distance, from each other in a direction circumferentially of the filter holder 13a.

Figure 5:
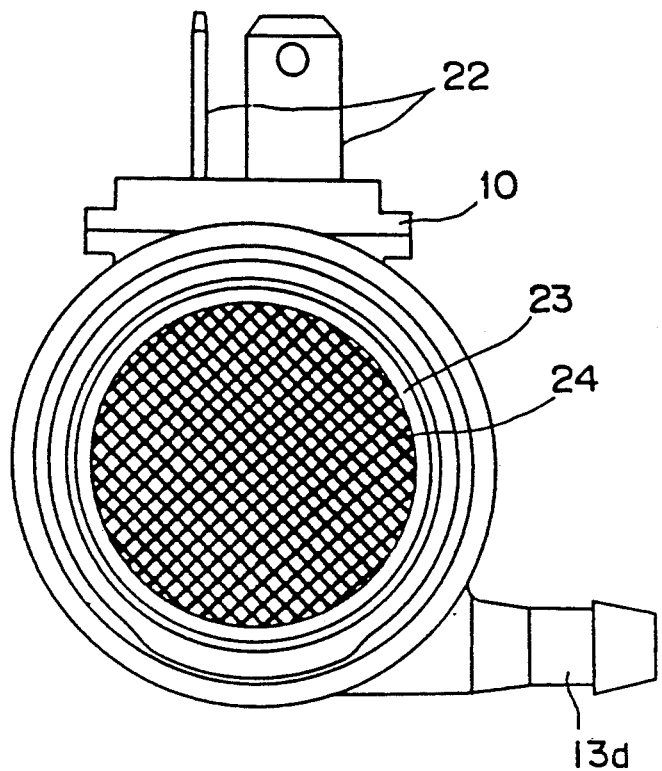
FIG. 5 is an end view of the washer pump as viewed from one side adjacent the filter member.
Figure 7:
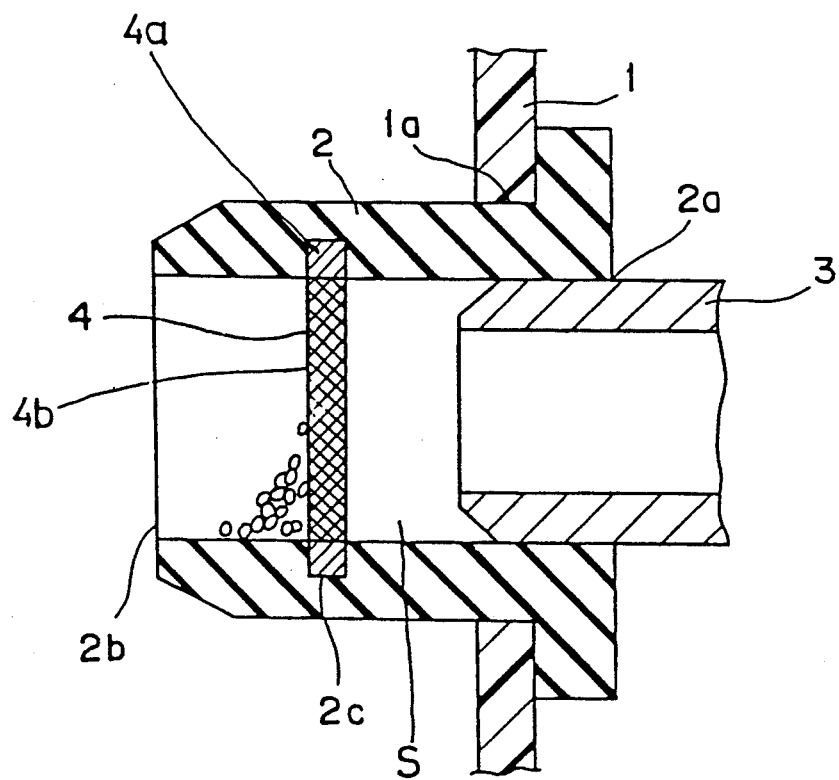
FIG. 7 is a longitudinal sectional view of the grommet and the inlet nipple employed in the prior art windshield washer system.

The filter member 15 which is employed in the form of a mesh so far shown is round in shape and is fitted to a ring-shaped filter mount 23 with a perforated region 24 of the filter member 15 situated in the opening of the ring-shaped filter mount 23. The filter mount 23 is of one-piece construction comprising a ring body 23b and an axial flange 23a which, when the filter mount 23 is fitted onto the filter holder 13a in a manner as will be described later, protrudes into the hollow of the filter holder 13a. The axial flange 23a has formed integrally therewith detent pawls 23c equal in number to the number of the detent cutouts 13e defined in the filter holder 13a. As best shown in FIGS. 3 and 5, the filter member 15 has its outer peripheral edge integrally formed with, or otherwise embedded in, in an outer end of the axial flange 23a adjacent the ring body 23 with the perforated region 24 thereof occupying the opening of the ring body 23.

The filter mount 23 carrying the filter member 15 can be snapped onto the filter holder 13a. Specifically, the detent pawls 23c are radially inwardly biased against their own resiliency in contact with the inner peripheral surface of the filter holder 13a as the filter mount 23 is mounted on the filter holder 23 with the axial flange 23b inserted into the hollow of the filter holder 13a. However, when the filter mount 23 is completely mounted, the detent pawls 23c once radially inwardly biased expand radially outwardly by the action of their own resiliency to engage into the associated detent cutouts 13e in the filter holder 13a. Each of the detent cutouts 13e is so sized that, when and after the filter mount 23 has been completely snapped onto the filter holder 13a in the manner described above, the respective detent cutout 13e can be left open partially as indicated by 25 in FIG. 3 to provide an air vent through which air trapped within a space S inside the filter holder 13a and delimited between the filter member 15 and the annular end wall 13b can be vented outwardly and into the interior of the rinsing fluid tank 10.

Where desired, the filter member 15 can be removed from the filter holder 13a together with the flter mount 23. This can readily be accomplished by pushing the pawls 23c exteriorly through the associated detent cutouts 13e so as to bend radially inwardly while pulling the filter mount 23 outwardly from the filter holder 13a.

Figure 4:
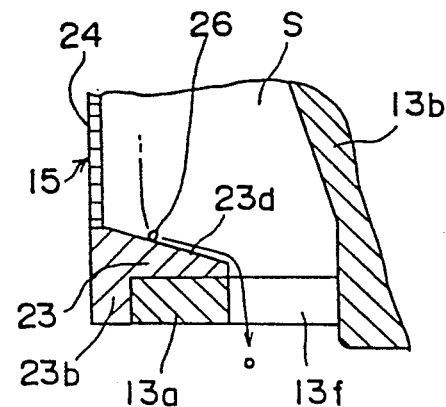

As best shown in FIG. 4, at least a bottom portion of the axial flange 23a of the filter mount 23 which occupies a lowermost position when the washer pump assembly 12 has been mounted in the tank 10 with the cylindrical casing 13 fluid-tightly inserted through the grommet 11 as shown in FIG. 2, is chamfered to provide a sloped face 23d extending downwardly towards the annular end wall 13b. On the other hand, a portion of the filter holder 13a confronting the sloped face 23d of the axial flange 23a is perforated to define a discharge hole 13f. Thus, it will readily be understood that particles forming the foreign matter having passed through the filter member 15 together with the rinsing fluid can be discharged to the outside of the cylindrical casing 13 after having moved along the sloped face 23d and then into the discharge hole 13f.

Figure 6:
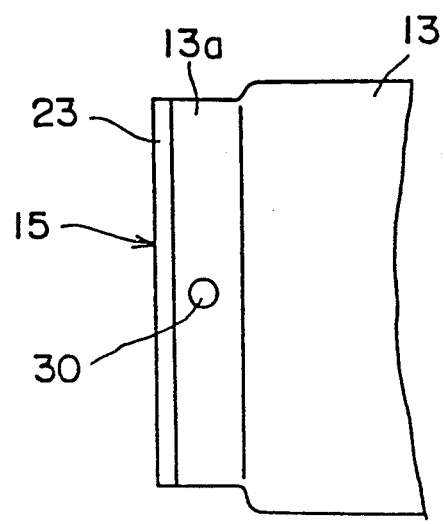
FIG. 6 is a schematic fragmentary side view of a modified form of the holder according to the present invention.

While in the foregoing description of the preferred embodiment of the present invention each of the detent cutouts 13e has been described of a size sufficient to form the air vent 25 when the respective detent pawl 23a is engaged in the associated detent cutout 13e, this is not always essential and one or more vent holes 30 may be formed in the filter holder 13a as shown in FIG. 6 while each detent cutout 13e is so sized as to correspond to the size of the associated detent pawl 13c.

Also, the filter holder 13a may not be always of the size described above, and may be of any desired size, provided that the outer diameter of the filter holder 13a is smaller than the outer diameter D of that portion of the cylindrical casing 13 which is encompassed by the grommet 11 and greater than the diameter r of the inlet port 16 in the end wall 13b.

The washer pump assembly 12 so constructed as hereinbefore described in accordance with the present invention operates in the following manner.

Assuming that the impeller 18 is driven by the drive unit, the rinsing fluid within the tank 10 is drawn towards the pump chamber 19 through the mesh region 14 of the filter member 15 and is then supplied under pressure towards the jetting nozzle through the axial passage 20 by way of the tubing 21.

Since the rinsing fluid is filtered by the filter member 15 during its flow therethrough, no foreign matter contained in the rinsing fluid will enter the pump chamber 19. Also, since the filter member 15 is fitted to an outer end of the filter holder 13a opposite to the cylindrical casing 13, there is no possibility that undersirable particles forming the foreign matter will pile up on one side of the filter member 15 opposite to the filter holder 13a.

Thus, it is clear that the washer pump assembly embodying the present invention is substantially free from such a problem that the rinsing fluid will not enter the pumping chamber and, hence, will not be jetted from the nozzle as a result of a clogging of the filter member.

As hereinbefore described, the cylindrical casing 13 of the washer pump assembly 12 is fitted to the side wall 10b of the tank 10 in the form as received by the grommet 11 which has been mounted in the mounting hole 10b in the side wall 10b. The inner end of the cylindrical casing 13 which protrudes into the tank 10 is formed with the filter holder 13a for the support of the filter member 15, said filter holder 13a having the inner diameter d2 so chosen as to be greater than the inlet port 16 in the end wall 13b. Because of this unique design, the effective cross-sectional area of the perforated region 24 of the filter member 14 can be advantageously chosen to be considerably greater than the size of the inlet port 16, thereby ensuring the rinsing fluid flows therethrough in a quantity rated in consideration of the size of the inlet port 16. Consequently, any possible reduction in pumping performance hitherto encountered in the prior art washer pump assembly due to the use of the filter member can be advantageously avoided.

The provision of the air vents 25 in the filter holder 13a is effective to ensure a supply of the rinsing fluid into the pump chamber 19 and, hence, to avoid any possible idle run of the pump assembly, because air trapped in the space between the filter member 14 and the annular end wall 13b can be positively vented to the outside of the cylindrical casing 13. It is to be noted that, even if foreign matter enters through the air vents 25, it can readily be discharged outwardly along the sloped face 23d and then through the discharge hole 13f, while avoiding a subsequent entry of the foreign matter into the pump chamber 19.

Although the present invention has been described in connection with the preferred embodiment thereof with reference to the accompanying drawings, it is to be noted that various changes and modifications are apparent to those skilled in the art. By way of example, the manner in which the washer pump assembly is supported in relation to the rinsing fluid tank may not be always limited to that shown in and described with reference to the accompanying drawings. Particularly, the fluid tank although having been described as comprised of the four side walls may be of a generally cylindrical configuration comprising a side wall of generally round cross-section.

Also, although reference has been made to the windshield washer system, the present invention can be equally applicable to the jetting of the rinsing fluid onto the headlight cover lenses and also onto the rear windowpane. Again, separate washer systems need not be always employed for jetting the rinsing fluid onto the windshield, the headlight cover lens and the rear windowpane and a single washer system may be employed in common to the windshield, the head light cover lenses and the rear windowpane.

Accordingly, such changes and modifications are to be understood as included within the scope of the present invention, as defined by the appended claims, unless they depart therefrom.

What is claimed is:

1. A washer pump assembly which comprises:
   a fluid tank for accommodating a quantity of a fluid medium to be jetted and having a side wall and a bottom wall;
   a washer pump means comprising a rotatably supported impeller and a generally cylindrical casing having first and second ends opposite to each other and also having a fluid outlet defined at the first end thereof, said washer pump means being secured to the side wall of the fluid tank with the second end of the casing protruding into the fluid tank, said casing having an annular end wall extending radially inwardly from an inner peripheral surface thereof and having a fluid inlet of a predetermined bore size defined therein, said casing also having a partition wall extending radially inwardly from the inner peripheral surface thereof and positioned on one side of the annular end wall close to the first end thereof thereby to define a pump chamber between the annular end wall and the partition wall, said impeller being operatively accommodated within the pump chamber;
   passage means communicating the pump chamber and the fluid outlet for discharging fluid medium under pressure during a rotation of the impeller;
   a filter member having a perforated region of a diameter greater than the bore size of the fluid inlet in the annular end wall, said filter member being positioned exteriorly of the second end of the casing with the perforated region aligned with the fluid inlet; and
   holder means for detachably securing the filter member to the second end of the casing, said holder means comprising a generally cylindrical filter holder protuding a distance axially outwardly from the second end of the casing in coaxial relation therewith, and a generally ring-shaped filter mount carrying the filter member and having a plurality of detent pawls, said filter holder having defined therein detent holes equal in number to the number of the detent pawls and spaced from each other in a direction circumferentially thereof, said detent pawls being engageable in the associated detent holes by a snap action when the filter mount carrying the filter member is fitted to the filter holder.

2. The washer pump assembly as claimed in claim 1, wherein at least one air vent defined in the filter holder.

3. The washer pump assembly as claimed in claim 2, wherein at least one of the detent cutouts is oversized relative to the associated pawl engageable therein and said air vent is defined by a portion of such oversized detent cutouts which is left open when such associated pawl is engaged in such oversized detent cutout.

4. The washer pump assembly as claimed in claim 1, wherein the filter holder has a discharge opening defined therein at a level closest to the bottom wall of the fluid tank and wherein a portion of the filter mount which confronts the discharge opening when the filter mount is fitted to the filter holder is downwardly sloped to substantially continue to the discharge opening for facilitating a discharge of foreign matter which may be contained in the fluid medium being sucked into the pump chamber.

5. The washer pump assembly as claimed in claim 2, wherein the filter holder has a discharge opening defined therein at a level closest to the bottom wall of the fluid tank and wherein a portion of the filter mount which confronts the discharge opening when the filter mount is fitted to the filter holder is downwardly sloped to substantially continue to the discharge opening for facilitating a discharge of foreign matter which may be contained in the fluid medium being sucked into the pump chamber.

6. The washer pump asssembly as claimed in claim 3, wherein the filter holder has a discharge opening defined therein at a level closest to the bottom wall of the fluid tank and wherein a portion of the filter mount which confronts the discharge opening when the filter mount is fitted to the filter holder is downwardly sloped to substantially continue to the discharge opening for facilitating a discharge of foreign matter which may be contained in the fluid medium being sucked into the pump chamber.

* * * * *